Patented Oct. 6, 1936

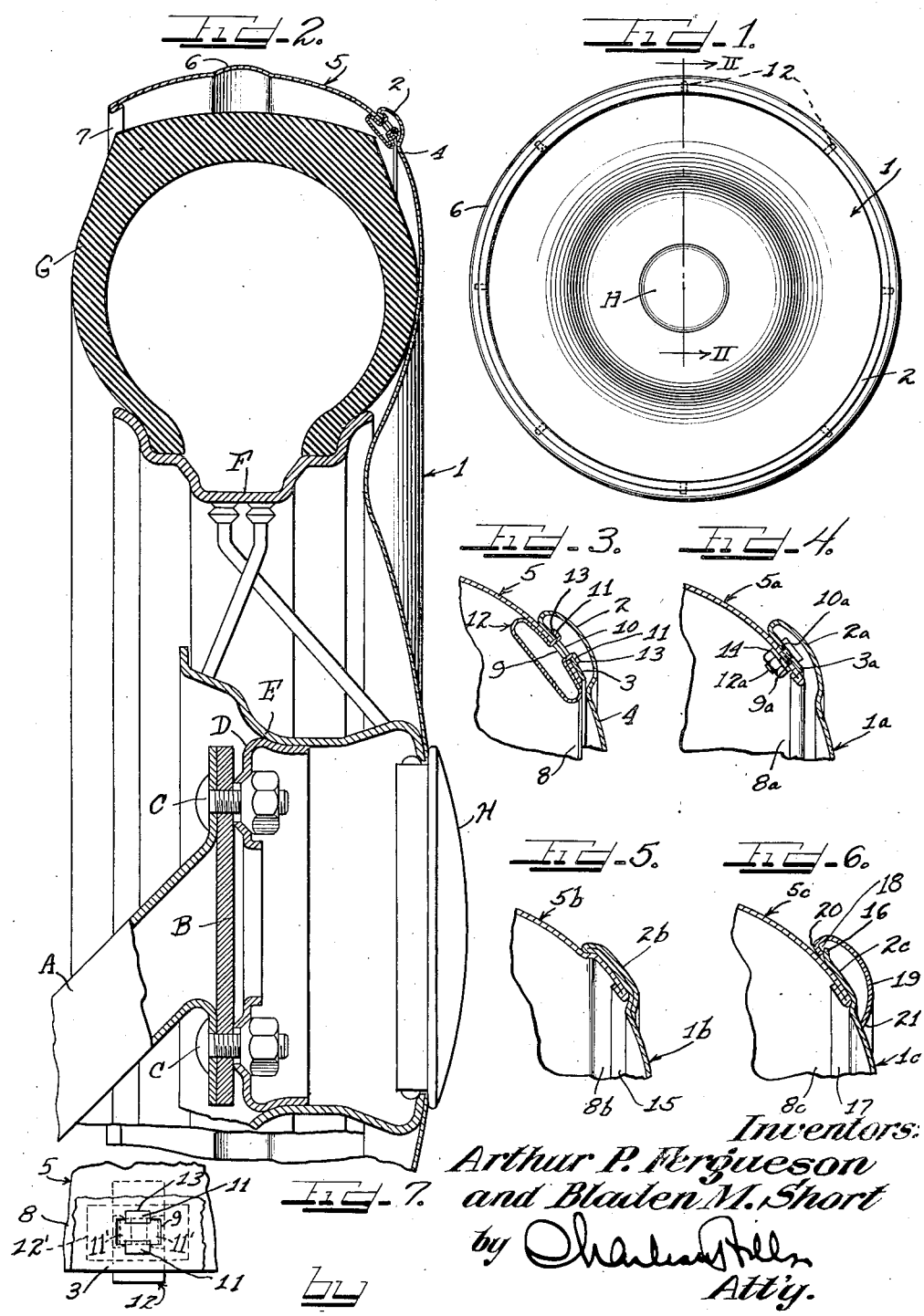

2,056,839

UNITED STATES PATENT OFFICE 2,056,839

TIRE COVER CONSTRUCTION

Arthur P. Fergueson and Bladen M. Short, Detroit, Mich., assignors to Lyon Cover Company, Detroit, Mich., a corporation of Michigan Application August 23, 1934, Serial No. 741,051

18 Claims. (Cl. 150—54)

This invention has to do with tire covers and is concerned more particularly with an improved tire cover construction embodying portions for covering the front and tread portions of a tire.

It is an object of the invention to simplify the construction of a tread and side wall covering members for a spare tire. It is a further object of the invention to provide a multi-part tire cover which may be readily assembled as a unitary cover and when so assembled has the appearance of a single piece cover.

It is another object of the invention to provide a multi-part tire cover with ornamental and reinforcing beading at the juncture of the parts.

Another object of the invention resides in the provision of a multi-part tire cover construction embodying beading which serves to conceal the juncture of the cover parts and in addition enhances the appearance of the cover structure.

In accordance with the general features of the invention, a tire cover comprising a rim formed to cover the tread of the tire and a side plate formed to cover a side wall of the tire is provided. In accordance with one form of the invention, the tire cover sections are overlapped and provided in their overlapping portions with registering openings. A series of sets of such openings is arranged circumferentially in the overlapping portions, and spring clips inserted so as to fasten the overlapped portions and consequently the tire cover sections together. These clips are positioned on the inside, and one of the cover sections is bulged outwardly over the juncture of the sections to provide a reinforcing, concealing and ornamental bead. In accordance with another form of the invention, the overlapped portions are bolted together. In another form of the invention, one of the lapped portions is bulged outwardly to form a recessed bead, and the other lapped portion is also bulged outwardly to fit in the bead, the two portions being welded or otherwise suitably secured together to provide a reinforced juncture between the sections. In another form of the invention, the overlapped portions are welded together, the outer of such portions being flared away from the inner portion to provide a peripheral pocket for receiving a marginal edge of a concealing and ornamental bead.

The construction forming the subject matter of this invention is particularly advantageous in that it greatly simplifies the manufacture of a unitary tread and side wall covering tire cover, inasmuch as the formation of such a cover from a single piece of material such as sheet metal would involve difficult mechanical operations making the cost of manufacture prohibitive.

Further objects and advantages of the invention will appear as the description proceeds.

This invention (in preferred forms) is illustrated in the drawing and hereinafter more fully described.

On the drawing:

Figure 1 is a front elevational view of a tire cover embodying one form of the invention.

Figure 2 is an enlarged fragmentary sectional view taken substantially in the plane designated by the line II—II in Figure 1, looking in the direction of the arrows.

Figure 3 is an enlarged fragmentary sectional view of the juncture of the tire cover sections as seen in the upper right hand portion of Figure 2.

Figures 4, 5 and 6 are views similar to Figure 3 but of modified forms of the invention.

Figure 7 shows how the clip of Figures 1, 2 and 3 may be assembled with the cover sections.

Referring now more particularly to the drawing, there is illustrated a spare wheel carrier A which may be mounted at the rear or either side or other suitable part of an automobile and carries an attaching flange B and bolts C arranged to extend through openings in an attaching collar D carried by the hub E of a wheel F on which a spare tire G is mounted. The tire cover about to be described is of such construction as to adapt it for use in connection with any spare tire however the same may be mounted.

In the various forms of the invention, the cover comprises essentially a side plate or disc 1 which terminates outwardly substantially at the forward margin of the tread of the tire and may be imperforate or, as shown, may be open centrally to allow the skirt of a hub cap H to pass therethrough and into the hub E, the inner periphery of the cover in such event, if desired, being sandwiched between the front part of the cap and the hub E. The front cover section 1, if desired, could be in the form merely of an annulus serving to cover only the front wall of the tire G. When made so as to extend inwardly beyond the tire, the cover section 1 is preferably formed in cross section to simulate generally the shape of the front of the spare wheel and tire as shown. The cover section 1 at its outer periphery is bulged forwardly to provide a concavo-convex bead 2 and, from the outer edge of the bead, the margin is return bent at 3. The portion 3 is preferably of greater transverse curvature than the adjacent portion 4 of the section 1 by about the thickness of the material for a purpose which will appear hereinafter.

The other section 5 of the cover comprises a rim or band of such width as to extend substantially across the tread of the tire so as to cover the same and may be provided with an outwardly bulged bead 6 for ornamental and reinforcing purposes. The margin of the band 5 which is to be arranged at the rear part of the tread is preferably return bent at 7 to provide a smooth edge which will not injure the hands, clothing or other parts with which the same may come in contact. The other margin 8 of the tread covering band 5 is formed with a circumferential series of openings 9 which may be of rectangular or other form. The band margin 8 is arranged to engage and terminate substantially flush with the edge of the returned margin 3 of the front section 1, with the margin 3 foremost.

The margin 3 is provided with a circumferential series of openings 10 formed to register with the openings 9 in the margin 8. When the openings are thus registered, the hook-like spring arms 11 at the ends of substantially C-shaped fastening buttons or clips 12 are snapped through said openings so as to resiliently engage opposed walls of said openings. The ends 11 of each clip 12 are preferably of the same width as the openings 9 and 10 so that when disposed therein in interlocked engagement with the opposed wall portions of said openings the clips 12 effectively prevent rattling between the sections 1 and 5 and at the same time serve as a means for securely fastening the sections together to provide a unitary cover construction. The margin 3 being indented slightly forward of the adjacent body portion 4 of the front cover section 1, and the sections 1 and 5 being preferably formed of shape-retaining material such as sheet metal of preferably the same thickness, it is evident that when the sections are fastened together, each section appears as an integral continuation of the other. The bead 2, moreover, completely conceals the juncture between the sections 1 and 5, and in addition serves as an ornamenting and reinforcing means for the juncture and for the cover structure as a whole.

The spring clips may be secured to the cover sections 1 and 5 in the manner shown in Figure 7. Slots 9 and 10 may be elongated in one direction to allow the tongues or hooks 11 to be readily extended therethrough, with the clip in the dotted position shown at 12' and the hooks in the dotted positions at 11'. Each clip is then rotated about 90° to hook its ends about the adjacent edge portions of the margins 3 and 8 as shown in full lines at 12 and 11 respectively. The hooks are so formed preferably as not only to tend to separate and thus tightly engage said portions edgewise but also to pinch said portions together so as to tightly secure the clips and portions together. With this construction it is a matter of but a few moments to completely assemble the sections. When the clips are assembled with the sections, a unitary tire cover having all of the advantages of a one-piece cover is provided. An additional advantage resides in the fact that should for any reason only one of the sections suffer serious injury or require repair, it may readily be disassembled from the other section and replaced by another such section or itself replaced when repaired.

If desired, the openings 9 and 10 may be of a length such as to enable one of the hook portions 11 to be inserted therethrough and shifted to a position where it engages one end wall of each of said openings, leaving sufficient clearance between said one hook portion and the other end wall of each opening for the subsequent insertion of the other of said hook ends 11. Thus the length of said openings may be slightly less than the distance between the extremities 13 of said hooks when the ends 11 are in interengagement. After the sections 1 and 5 are connected by the clips 12, should the hook ends 11 of such clips for any reason be forced into engagement with each other, they will be unable to pass outwardly through the openings 9 and 10, and thus the clips 12 will provide a permanent connection between the sections 1 and 5.

Instead of fastening the sections by clips, they may be fastened by bolt and nut means. To this end, the section 1a is provided at its outer periphery with a bead 2a and has its margin 3a beyond the bead 2a formed with a circumferential series of bolt openings 10a. Bolts 12a are extended through said openings 10a and thereafter the margin 3a is return bent with respect to the bead 2a so as to have their width in cross section the shape of a loop, with the heads of the bolts between the margin 3a and the bead 2a.

The tread covering band 5a extends forwardly so that its margin 8a is engageable with the rear surface of the margin 3a. The margin 8a is provided with a series of openings 9a adapted to register with the openings 10a in the margin 3a, for the reception of the shanks of the bolts 12a. Nuts 14 are thereupon applied to the shanks of said bolts to fit tightly against the inner surface of the margin 8a, and if desired lock washers (not shown) may be inserted between the margin 8a and nuts 14.

Thus the cover structure is connected as a unit with the section 5a appearing as an integral extension of the section 1a.

In the form of the invention appearing in Figure 5, the outer periphery of the front section 1b is doubled upon itself to provide a double thickness concavo-convex bead 2b with its convex portion foremost. The band member 5b has its front margin 8b bulged into a form similar to the bead 2b so as to fit therein as shown in Figure 5. The edge of the marginal portion 8b is preferably return bent as at 15, and the portions 2b and 8b are united as by welding, brazing or the like. The margins are so connected, that the body portions of the sections 1b and 5b constitute essentially continuations of each other, and the cover as a whole has the appearance of a single piece member provided with a bead at 2b. The bead 2b thus conceals the juncture of the sections 1b and 5b and at the same time has a pronounced reinforcing and ornamental effect. If desired, before the bead 2b is doubled, the part thereof inwardly of the outer margin may be welded or otherwise suitably secured to the margin 8b and thereafter the outer margin of the portion 2b doubled upon the welded portion so as to conceal the welding.

In accordance with the form of the invention appearing in Figure 6, the margin 2c of the front section 1c is indented forwardly and flared forwardly at its edge 16. The band section 5c is arranged so that its forward margin 8c is fitted in the recess formed by indenting the margin 2c of the section 1c, and the margin 8c is preferably return bent to provide a smooth edge 17. The margins 2c and 8c are preferably welded or brazed together or if desired they may be united by rivets, bolts or the like. They are preferably united throughout their peripheries so as to provide a substantially integral tire cover structure.

Between the flared edge portion 16 of the margin 2c and the body of the band 5c there is provided a preferably outwardly opening peripheral groove 18.

To the end that the juncture between the sections 1c and 5c may be completely concealed as well as with a view to reinforcing and ornamenting the cover as a whole, there is provided a preferably resilient concavo-convex bead 19 arranged with its convex face foremost. The bead 19 has an outer margin which is inturned at 20 so as to fit in the groove or pocket 18, and is of such transverse extent that its inner margin 21 is engageable with the body of the section 1c inwardly of its indented marginal portion 2c. Thus the bead 19 is arranged to entirely conceal the juncture of the sections 1c and 5c so as to give the whole the appearance of a one-piece cover structure.

The bead 19 may be of any suitable construction and is preferably made of resilient sheet metal and may be in the form of a split ring which may be expanded until the inturned margin 20 clears the flared edge portion 16 of the margin 2c, and thereafter, upon release of the expanding pressure, allowed to contract so as to fit the inturned margin 20 in the pocket 18. If desired, the bead 19 may have its ends connected by any suitable coupling means, and if desired its ends may be riveted or otherwise suitably secured to the cover section 1c or the cover section 5c or both.

It will be seen from the foregoing that the present invention embodies the construction of what is in effect a single piece unitary cover which serves to cover the tread as well as the front wall of a spare tire, embodying a very inexpensive means for securing front wall covering and tread covering parts together as a unit. The invention affords in conjunction with the ready securement of the front wall and tread covering parts together, a combined reinforcing, concealing and ornamental bead. It is to be understood that while the drawing illustrates a cover construction which is completely circular, it is well within the province of the invention to provide a split cover, of either greater or less extent than 360°, embodying the principles of the invention.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. Tire cover construction comprising tread and side wall covering members shaped to be applied to a tire from the same side and having lapped margins provided with a circumferential series of communicating holes, and a connector disposed in each set of holes and securing the members together as a substantially integral cover applicable to and removable from a spare tire as a unit.

2. Tire cover construction comprising a pair of sheet material members formed to be applied to a tire from the same side and to cover adjacent parts of a spare tire, and snap fastener means connecting said members together permanently so as to provide a substantial integral cover construction.

3. Tire cover construction comprising a pair of form-retaining sheet material members shaped to cover adjacent parts of a spare tire, one of said members having a rearwardly disposed return bent portion lapping a portion of the other member, said portions having communicating openings, and connecting means disposed in said openings and enlarged at opposite ends of said openings so as to secure the members together, the front of said one member adjacent its bent portion being imperforate so as to conceal said bent portion and the connection between said members.

4. A substantially rigid built-up cover construction for spare tires, comprising an arcuate form-retaining sheet material band member shaped to cover and be shoved over the tread of a tire and an arcuate front plate member shaped to extend inwardly from the tread so as to cover the front wall of the tire, said members having lapped margins, and means securing said margins together in lapped relation, one of said margins being return bent rearwardly relative to the member of which it is a part, whereby said margins and means are protected and concealed by the member last named.

5. A substantially rigid built-up cover construction for spare tires, comprising an arcuate form-retaining sheet material band member shaped to cover and be shoved over the tread of a tire and an arcuate front plate member shaped to extend inwardly from the tread so as to cover the front wall of the tire, said members having lapped margins, and means securing said margins together in lapped relation, one of said margins being return bent rearwardly relative to the member of which it is a part, the member last named being bulged in front of its return bent margin so as to provide a protective, concealing and ornamental bead at the juncture of said members.

6. A substantially rigid built-up cover construction for spare tires, comprising an arcuate form-retaining sheet material band member shaped to cover and be shoved over the tread of a tire and an arcuate front plate member shaped to extend inwardly from the tread so as to cover the front wall of the tire, said members having lapped margins, one of said margins being return bent rearwardly relative to the member of which it is a part and providing a circumferential pocket, said margins having a circumferential series of communicating openings, and spring clips extending through into openings into said pocket and clamping said margins together.

7. A substantially rigid built-up cover construction for spare tires, comprising an arcuate form-retaining sheet material band member shaped to cover and be shoved over the tread of a tire and an arcuate front plate member shaped to extend inwardly from the tread so as to cover the front wall of the tire, said members having lapped margins, one of said margins being return bent rearwardly relative to the member of which it is a part and providing a circumferential pocket, said margins having a circumferential series of communicating openings, and spring clips extending through said openings into said pocket and connected to said margins by bayonet joints, each clip having spring hook ends inherently pressing against opposite walls of said openings and clamping said margins together.

8. Tire cover construction comprising substantially circular members shaped to cover adjacent parts of the tire and to be applied to the tire from the same side and having lapped margins provided with a circumferential series of communicating holes and a connector disposed in each set of holes and securing the members together as a substantially integral cover applicable to and removable from the tire as a unit.

9. Tire cover construction comprising a pair of form-retaining sheet material members shaped to cover adjacent parts of a spare tire, one of said members having a rearwardly disposed return bent portion lapping a portion of the other member, said portions having communicating openings, and connecting means disposed in said openings and enlarged at opposite ends of said openings so as to secure the members together, said construction including means shielding the connection between said members.

10. A substantially rigid built-up cover construction for spare tires, comprising arcuate form-retaining sheet material members shaped to cover adjacent parts of the tire, said members having lapped margins, and means securing said margins together in lapped relation, one of said margins being return bent rearwardly relative to the member of which it is a part, the member last named being bulged in front of its return bent margin so as to receive said means and provide a protective, concealing and ornamental bead at the juncture of said members.

11. A substantially rigid built-up cover construction for spare tires, comprising arcuate form-retaining sheet material members shaped to cover adjacent parts of the tire, said members having lapped margins provided with a circumferential series of communicating openings, and spring clips extending through said openings and clamping said margins together, said construction including a portion overlying said openings and the outer extremities of said clips to conceal them.

12. A substantially rigid built-up cover construction for spare tires, comprising arcuate form-retaining sheet material members shaped to cover adjacent parts of the tire, said members having lapped margins provided with a circumferential series of communicating openings, and spring clips extending through said openings and connected to said margins by bayonet joints, each clip having spring hook portions inherently pressing against opposite walls of said openings and clamping said margins together.

13. Tire cover construction comprising a circular cover part, an annular bead part return bent adjacent the outer side of the cover part, said parts having communicating openings in circular formation including a series of holes in one of said parts, and means shielded by said bead part and comprising connecting elements extending in said holes and engaging said parts for connecting them together, each of said elements including an integral enlargement at the inner side of the cover part and arranged to prevent withdrawal of said element toward the bead part.

14. In a construction of the class described, a circular cover part, an annular bead part having rearwardly disposed retaining means adjacent the outer side of the cover part, said means and cover part having communicating openings in a circular formation including a series of holes in the cover part, fastening means shielded by said bead part and including connecting elements extending from said retaining means through said holes and having integral enlargements engaging the inner side of the cover part to prevent separation of said parts.

15. In a cover construction of the class described, a circular cover part, an annular bead part return bent at the rear thereof adjacent the outer side of the cover part, said cover part and the rear of the bead part having communicating openings in a circular formation including a series of holes in the cover part, and means shielded by said bead part and fastening said parts together, said means comprising spaced enlarged portions engaging the inner sides of the bead and cover parts adjacent said openings and reduced intermediate portions in said holes and integrally uniting said enlarged portions.

16. In a cover construction for wheels or tires, a circular cover part, an annular bead part return bent at the rear thereof adjacent the outer side of the cover part, said cover part and the rear of the bead part having communicating openings in circular formation including a series of holes in the cover part, and pliable means shielded by said bead part and fastening said parts together, said means comprising a stem extending through each hole and bent at one end so as to extend at an angle to the hole and engage the inner side of one of said parts, said means at the other end of the stem extending at an angle to the stem and engaging the inner side of the other part adjacent said hole.

17. In a cover construction for wheels or tires, a circular cover part, an annular bead part return bent at the rear thereof adjacent the outer side of the cover part, said cover part and the rear of the bead part having communicating openings in circular formation including a series of elongated holes in the cover part, and pliable means shielded by said bead part and fastening said parts together, said means comprising a flat stem extending through each hole and bent at one end so as to extend at an angle to the hole and engage the inner side of one of said parts, said means at the other end of the stem extending at an angle to the stem and engaging the inner side of the other part adjacent said hole.

18. Spare wheel or tire cover construction comprising a circular cover part, an annular bead part return bent at the rear thereof adjacent the outer side of the cover part, said cover part and the rear of the bead having communicating opening in circular formation including a series of holes in the cover part, and pliable means shielded by said bead part and fastening said parts together, said means comprising a stem extending through each hole and bent at one end so as to extend at an angle to the hole and engage the inner side of one of said parts, said means at the other end of the stem extending at an angle to the stem and engaging the inner side of the other part adjacent said hole, said means being so formed as to require yielding of the material of which said means is made before disassembly of the parts can be effected.

ARTHUR P. FERGUESON.
BLADEN M. SHORT.